Jan. 27, 1970  G. P. R. FARR  3,491,859
AUTOMATIC ADJUSTERS
Filed Dec. 18, 1967  3 Sheets-Sheet 1

$$T_o = Wr \frac{\mu \sec\beta - \tan\alpha}{1 + \mu \sec\beta \tan\alpha} \quad (1)$$

$$T_i = Wr \frac{\mu \sec\beta + \tan\alpha}{1 - \mu \sec\beta \tan\alpha} \quad (2) \quad \Big\} \text{FIG.3.}$$

$$T_c = WR\mu' \quad (3)$$

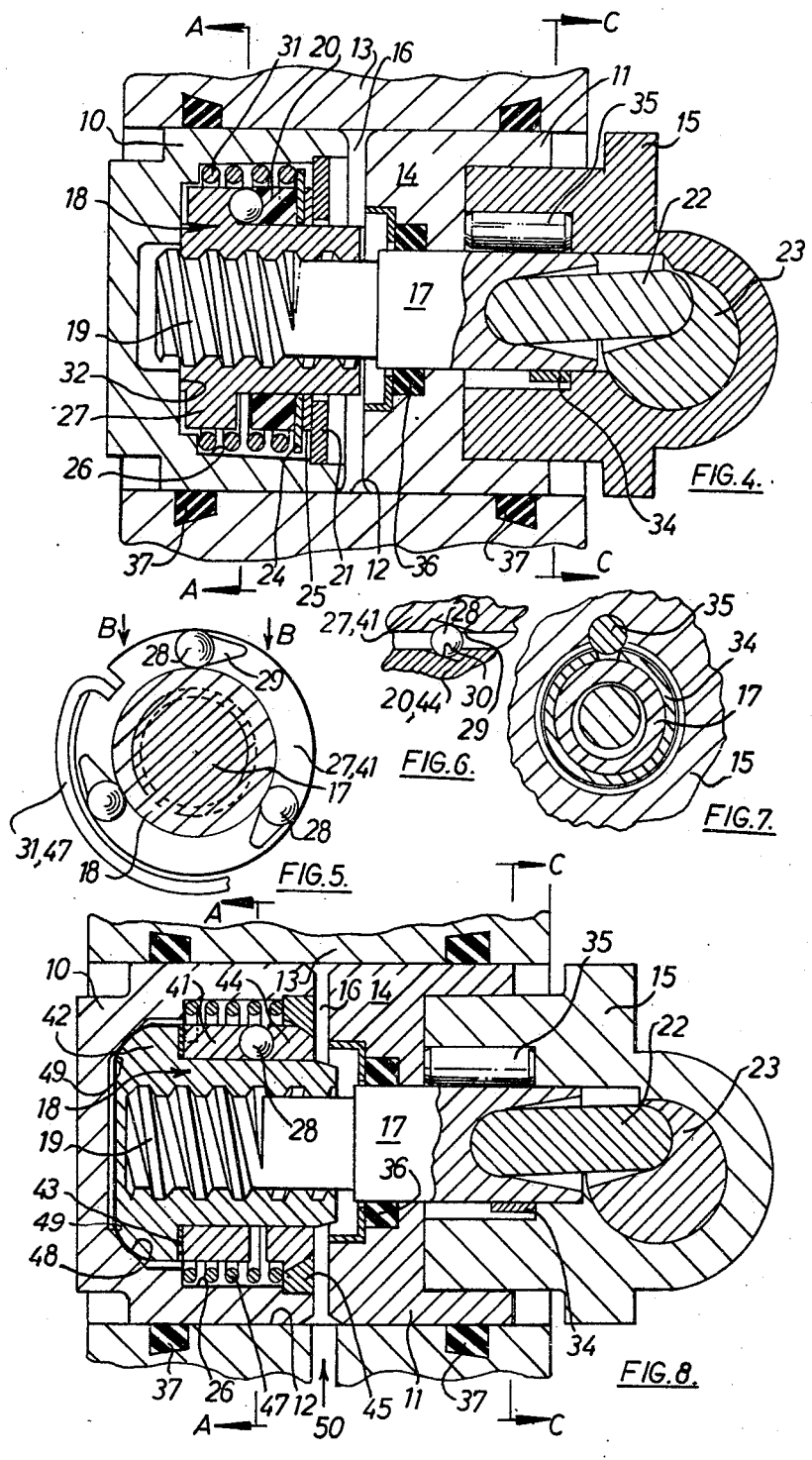

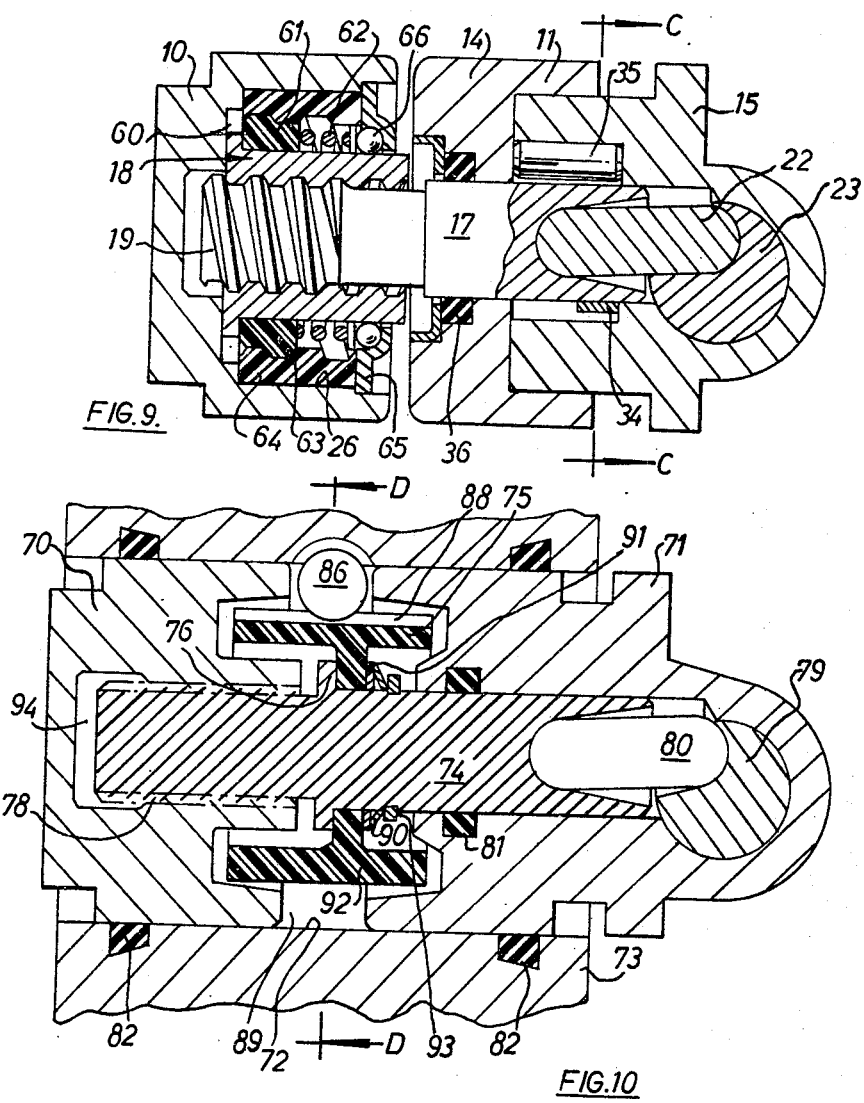

United States Patent Office 3,491,859
Patented Jan. 27, 1970

3,491,859
AUTOMATIC ADJUSTERS
Glyn Phillip Reginald Farr, Kenilworth, England, assignor to Girling Limited, Birmingham, England
Filed Dec. 18, 1967, Ser. No. 691,564
Claims priority, application Great Britain, Jan. 4, 1967, 524/67
Int. Cl. F16d 65/38
U.S. Cl. 188—196                                         22 Claims

ABSTRACT OF THE DISCLOSURE

An automatic adjuster, preferably for a vehicle brake, comprises two relatively rotatable members with a screw thread connection therebetween and a friction clutch or brake whose slip torque lies between the lower and higher frictional torques arising at the screw thread connection when said members are relatively turned with and against a load to which the screw thread connection is subjected. One part of the friction clutch or brake is caused to turn back and forth relatively to one of said members responsively to a requirement for adjustment when the screw thread connection is under axial load. This causes a relative turning movement between said members in one direction only. The friction clutch or brake may be subjected to the same axial load as the screw thread connection when adjustment takes place or it may comprise a pre-loaded friction clutch.

Figure 1:
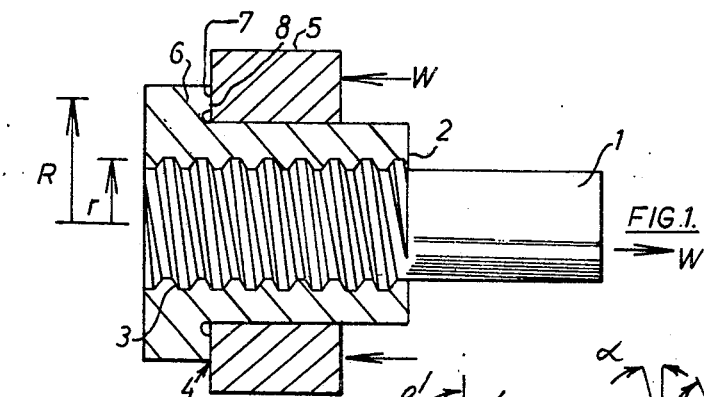

As applied to a spot type disc brake, the adjuster may be fitted between one of a pair of opposed pistons of a hydraulic actuator and a mechanical actuator fitted in the other piston.

---

The present invention relates to automatic adjusters which may, for example, be used in vehicle braking systems.

The present invention is based upon the principle that, when a screw thread connection between two members is under a given load, a larger torque is required to turn the members relatively to one another in a direction against the load than in a direction with the load.

According to the present invention, an automatic adjuster comprises first and second relatively rotatable members having a screw thread connection therebetween, a friction clutch or brake associated with said second member and means effective responsively to a requirement for adjustment for causing a relative back and forth turning movement between one part of said friction clutch or brake and one of said first and second members when said screw thread connection is under an axial load in one direction, the slip torque of said friction clutch or brake being greater than the lower frictional torque arising at said screw thread connection when turned in a direction with said axial load but less than the higher frictional torque arising at said screw thread connection when turned in a direction against said axial load, whereby said relative back and forth turning movement causes a relative turning movement between said first and second members in one direction only.

Hereinafter said friction clutch or brake is referred to as "said rotary friction device."

In preferred embodiments of the invention, said axial load. In some embodiments said axial load is transmitted. In some embodiments said axial load is transmitted through said rotary friction device as well as through said screw thread connection.

In one embodiment of the invention, said first member is non-rotatable relative to a first part of said rotary friction device and means are provided for causing intermittent back and forth relative rotation between a second part of said rotary friction device and said second member. In such embodiment said means for causing relative rotation may comprise helical cam or reversible screw thread means between said second member and said second rotary friction device part and a return spring such that the application of an axial force between said second member and said second rotary friction device part causes relative rotation therebetween in one direction with spring return upon the removal of said axial force. In this embodiment said rotary friction device is conveniently a friction brake, said first part of which is fixed, said first member being non-rotatable.

In another embodiment, a first part of said rotary friction device is effectively part of said second member. In this case the means for turning a first part of said rotary friction device relative to one of said members conveniently comprises helical cam or reversible screw thread means operative between a further member non-rotatable relative to said first member and a second part of said rotary friction device. In this embodiment said rotary friction device is conveniently a friction clutch, said further member is fixed and said first member is non-rotatable.

In yet another embodiment of the invention, said rotary friction device is a pre-loaded friction clutch, said turning means being operative upon one part of said clutch the other part of which is effectively a part of said second member. When such an adjuster is applied to a hydraulic actuator for a brake the hydraulic pressure may be used to move a plunger back and forth, which plunger is coupled to said one clutch part.

To enable the adjuster to be made of a compact size it is preferable that the coefficient of friction at said rotary friction device be less than the coefficient of friction at the screw thread connection. This may be achieved by inserting between the friction faces of said rotary friction device a washer of a material having such a lower coefficient of friction or by making at least one of the parts of said rotary friction device of such a material. A suitable such material is polytetrafluoroethylene.

Figure 2:
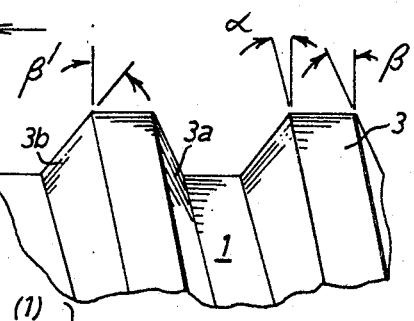
Figure 11:
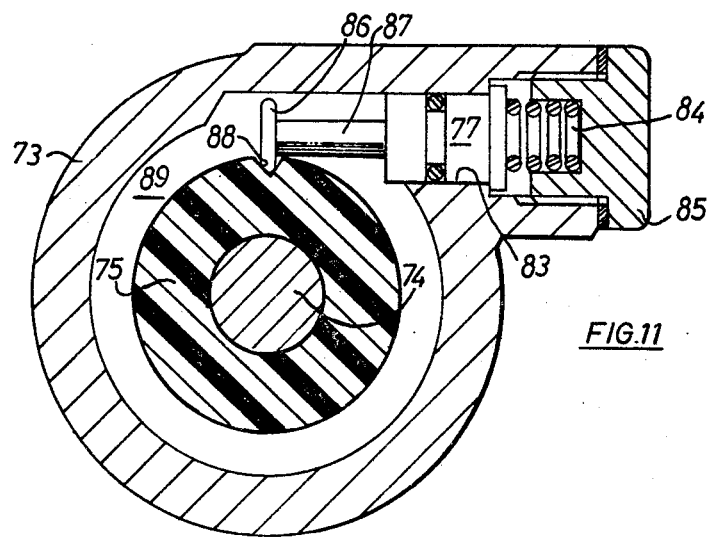

The invention is further described, by way of example, with reference to the accompanying drawings, in which:

FIG. 1 is a sectional view of a simple form of automatic adjuster constructed in accordance with the invention, FIG. 2 is an enlarged detail of FIG. 1, FIG. 3 shows three mathematical formulae, FIG. 4 is a sectional view of one embodiment of automatic adjuster as applied to an opposed piston type of hydraulic actuator for a disc brake, FIG. 5 is a detailed section on the line A—A of FIG. 4, FIG. 6 is a detailed section on the line B—B of FIG. 5, FIG. 7 is a detailed section on the line C—C of FIG. 4, FIG. 8 is a longitudinal section of another embodiment of automatic adjuster as applied to an opposed piston type of hydraulic actuator, FIG. 9 is a similar sectional view of a further embodiment of automatic adjuster, FIG. 10 is a sectional view of still another embodiment of automatic adjuster for an opposed piston type hydraulic actuator for a disc brake, and FIG. 11 is a section on the line D—D of FIG. 10.

Referring now to FIGS. 1 and 2, a simplified form of automatic adjuster constructed in accordance with the invention comprises a rod 1, a nut 2 having a screw thread connection 3 with the rod 1 and a rotary friction device in the form of a friction clutch 4. The friction clutch 4 comprises a rotatable ring 5 and a flange 6 on the nut 2, the ring 5 and flange 6 having annular friction faces 7 and 8 abutting one another. Means (not shown) are provided for turning the ring 5 back and forth relative to the rod 1.

Adjustment is effected when the adjuster is carrying a load W applied to the right on the rod 1 and to the left on the ring 5. The load W is thereby transmitted between the friction faces 7 and 8 and between the screw thread connection 3.

In the equations of FIG. 3, $r$ denotes the mean radius of the screw thread connections 3 and $R$ denotes the mean radius of the friction faces 7 and 8 as indicated in FIG. 1, $\alpha$ denotes the pitch angle of the screw thread connection 3 and $\beta$ denotes the flank angle of the flank of the screw thread connection 3 under load as shown in FIG. 2, $\mu$ denotes the coefficient of friction at the screw thread connection and $\mu'$ denotes the coefficient of friction at the friction faces 7 and 8. Equation 1 gives the frictional torque $T_o$ required to turn the screw thread connection 3 in the direction of the load W i.e. the frictional torque arising between the rod 1 and the nut 2 when the nut 2 is screwed to the left in FIG. 1 relative to the rod 1. Equation 2 gives the frictional torque $T_1$ arising between rod 1 and the nut 2 when these members are screwed in the opposite direction but with the same axial load W. Equation 3 gives the clutch torque $T_c$ arising at the clutch faces 7 and 8 when slipping occurs. Equation 3 would of course require modification if the faces 7 and 8 were not radial. For example they might be conical, in which case Equation 3 would be modified to include the cone angle. $\mu$ and $\mu'$ are so chosen relative to one another that $T_c$ is greater than $T_o$ but less than $T_1$. Thus, turning of the ring 5 in one direction relative to the rod 1 causes slipping at the friction clutch 4 whereas turning of the ring 5 in the other direction relative to the rod 1 causes slipping at the screw thread connection 3. Automatic adjustments between the members 1 and 2 in one axial direction may be thereby effected by turning the ring 5 back and forth when the load W is applied as shown. The turning of the ring 5 back and forth effects adjustment only when the axial load W is applied so that it is convenient to arrange for an axial load W to be applied to the clutch faces 7 and 8 only when adjustment is required.

By way of example, $r$ is 0.22 inch, $R$ is 0.40 inch, $\mu$ is 0.2, $\mu'$ is 0.1, $\alpha$ is 8½° and $\beta$ is 14°. For a load W of 10 lbs. the torque $T_o$ to wind the rod out is 0.12 pound-inch, the torque $T_1$ to wind the rod 1 in is 0.81 pound-inch, and the clutch torque $T_c$ is 0.40 pound-inch.

It will be seen that because R is larger than r it is necessary to make $\mu'$ correspondingly smaller than $\mu$ in order to obtain the desired inter-relation between the three torques. This can be conveniently achieved by inserting between the faces 7 and 8 a washer of a material having a suitable coefficient of friction or by making at least one of the parts 5 and 6 of such a material. A suitable material is polytetrafluoroethylene. If $\mu$ and $\mu'$ were approximately the same, R and r would have to be approximately the same and this could only be achieved by arranging the friction clutch axially to one side of the screw thread connection thereby increasing the length of the adjuster.

FIGS. 4 to 11 of the drawings show various embodiments of automatic adjuster in accordance with the invention as applied to an opposed piston type of hydraulic actuator for a disc brake wherein two pistons are slidable in a common bore extending through a fixed body member. One piston bears against a directly operated pad at one side of the disc and the other piston bears against a yoke slidably guided in grooves along opposite sides of the fixed body member and supporting an indirectly operated pad at the other side of the disc. Such a disc brake is described in U.S. Patent No. 3,245,500 to Hambling et al., and in U.S. Patent No. 3,421,602 to Hadyn L. Craske. However, the invention is not limited to use with such an actuator and is applicable quite generally to vehicle braking systems. The important thing is that, when there is excessive brake movement due to pad wear, an axial load is applied to said rotary friction device and to the screw thread connection whilst one of the parts of said rotary friction device is caused to turn back and forth relative to one of the members having the screw thread connection.

Referring now to FIG. 4, a hydraulic actuator comprises a pair of opposed pistons 10 and 11 slidable in a common bore 12 extending through a fixed body member 13. The piston 10 bears against the directly operated pad while the piston 11 is in two parts 14 and 15 rigidly secured to one another, the part 15 bearing against the yoke (not shown). An inlet (not shown) is provided to the space 16 between the pistons 10 and 11. The movement of the pistons 10 and 11 towards one another is limited by an automatic adjuster comprising a rod 17, a nut 18 having a buttress-type screw thread connection 19 with the rod 17 and a friction brake comprising a cam ring 20 and an abutment ring 21. Rightward motion of the rod 17 is limited by a dolly 22 arranged between the rod 17 and a cam 23 journalled in the piston part 15 which bears against the yoke. Purely mechanical operation of the disc brake, e.g. by a hand brake lever, is achieved by anti-clockwise movement of the cam 23. Clockwise movement of the cam 23 is limited by a stop (not shown). The screw thread connection 19 and the friction brake 20, 21 are contained within a blind bore 26 within the piston 10. The abutment ring 21 is a force-fit in the end of the blind bore 26.

The friction brake 20, 21 includes a metal washer 24, which for the purposes of understanding the operation of the adjuster may be regarded as part of the cam ring 20, and a washer 25 between the disc 24 and the abutment ring 21. The washer 25 is of a material, such as polytetrafluoroethylene, having a suitable coefficient of friction. The cam ring 20 forming part of the friction brake co-operates with a flange 27 on the nut 18. As shown in FIGS. 5 and 6, three balls 28 are arranged between the cam ring 20 and the flange 27. The balls 28 are received in cooperating cam recesses 29 and 30 in the flange 27 and the cam ring 20. Thus, when the nut 18 is moved to the right relative to the cam ring 20, relative rotation between these parts is automatically caused by the camming action of the balls 28. A torsion spring 31 acts between the flange 27 and the cam ring 20 and turns these relative to one another so that they are urged apart by the camming action of the balls 28 until the end of the nut 18 abuts a shoulder 32 towards the base of the blind bore 26.

The piston 10 is prevented from turning by the directly operated pad which it abuts and the piston 11 is prevented from turning by the yoke. The rod 17 is prevented from turning in the piston 11 by a spring ring 34 fitted about the rod 17 and a pin 35 fitted in a groove inside the piston part 15, the pin 35 engaging the ends of the spring ring 34 as shown in FIGS. 4 and 7. A sealing ring 36 seals the rod 17 to the part 14 of the piston 11 and seals 37 seal the pistons 10 and 11 to the bore 12.

During operation of the actuator by applying hydraulic fluid pressure to the space 16, the pistons 10 and 11 are urged apart to apply the disc brake and the rod 17 is urged to the right against the dolly 22 and against the axial force of the torsion spring 31. This is because the fluid pressure finds its way through the axial clearance in the screw thread connection 19 to the left-hand end of the rod 17. The axial clearance of the screw thread connection 19 is such that during normal operation of the disc brake this clearance is not completely taken up by the relative movement between the piston 10 and the rod 17 nor during "knock back" of the piston 10 such as may occur due to disc deflection, for example on cornering. The axial thread clearance is of the order of twenty thousandths of an inch.

When adjustment is required, the thread clearance is completely taken up and the nut 18 is moved to the right by the spindle 17 relative to the piston 10. This moves the flange 27 towards the cam ring 20 causing relative rotation in one direction between these parts. This relative rotation is such that the nut 18 turns clockwise (as viewed in FIG. 5) relative to the cam ring 20. With the relative rotation in this sense the frictional torque arising at the screw thread connection 19 is the lower torque $T_0$ and is less than the frictional torque $T_c$ which the friction brake 20, 21 is capable of sustaining. The cam ring 20 is thereby prevented from turning by the friction brake whereas the nut 18 is turned on the rod 17 to effect the required adjustment. When the hydraulic pressure is released the torsion spring 31 causes relative rotation between the flange 27 and the cam ring 20 in the opposite direction until the nut again abuts the shoulder 32. However, because the relative rotation is now in the opposite sense, the frictional torque capable of being developed at the screw thread connection 19 is now the higher torque $T_i$ and is in fact greater than the frictional torque $T_c$ which the friction brake 20, 21 is capable of sustaining. The cam ring 20 therefore turns clockwise (as viewed in FIG. 5) relative to the flange 27 and the nut 18 is not turned back.

When the hand brake is applied, the cam 23 is turned anticlockwise (FIG. 4) and acts on the rod 17 through the dolly 22. The hand brake force is applied through the screw thread connection 19 to the nut 18 which is thereby pressed against the abutment shoulder 32 in the piston 10 whereby the pistons 10 and 11 are urged relatively apart to apply the disc brake. Turning of the nut 18 on the rod 17 during application of the hand brake is resisted by the friction which arises at the shoulder 32.

When it is desired to replace worn pads by new pads, the piston 10 can be rotated while the directly operated pad is removed and this causes the nut 18 to be screwed back along the rod 17. The axial compression in the spring 31 creates sufficient friction at the shoulder 32 to enable the nut 18 to turn with the piston 10 when this is done.

The buttress type of screw thread connection 19 illustrated is particularly convenient from the manufacturing and strength point of view but other types of screw thread connection may be used.

The embodiment of actuator shown in FIG. 8 is in many respects the same as that of FIG. 4. Also the sections shown in FIGS. 5 and 7 are sections on the lines A—A and C—C respectively in FIG. 8 as well as in FIG. 4. The embodiment of FIG. 8, however, has a friction clutch which comprises a cam ring 41 and a flange 42 on the nut 18. An anti-friction washer 43 of polytetrafluoroethylene is arranged between these two parts. The cam ring 41 co-operates with a fixed abutment ring 44 retained by a bush 45 force-fitted into the open end of the piston bore 26. Three balls 28 operate with a camming action between the rings 41 and 44 as shown in FIGS. 5 and 6. A torsion spring 47 operates between the cam ring 41 and the abutment ring 44 in the same manner as the spring 31 of FIG. 4. A spherical seating surface 48 on the nut 18 normally rests against a conical abutment surface 49 in the blind bore 26. The abutment ring 44 rests against the ring 45 through another spherical seating surface. These spherical seating surfaces ensure that the pistons 10 and 11 are not prevented from axially aligning with one another in the bore 12. FIG. 8 shows the inlet 50 for the brake fluid to the space 16 between the pistons. The adjuster of FIG. 8 operates in almost the same manner as the adjuster shown in FIG. 1. The cam ring 41 is caused to turn back and forth by the balls 28 in the same manner as is described with reference to FIG. 4. When adjustment is required, the surface 48 is unseated from the surface 49 because the thread clearance is taken up and the rod 17 is urged to the right by the fluid pressure and the camming action of the balls 28 causes the nut 18 to turn in a clockwise direction as viewed in FIG. 5 upon leftward movement of the piston 10 relative to the rod 17 and so effects the necessary adjustment. Upon release of the brake, slipping takes place between the cam ring 41 and the flange 42 and the nut 18 is not turned back.

The embodiment of FIG. 9 is essentially the same as that of FIG. 8. Parts in FIG. 9 like those of FIGS. 4 and 8 are denoted by like reference numerals and the section shown in FIG. 7 is a section on the line C—C of FIG. 9. The embodiment of FIG. 9 differs from that of FIG. 8 principally in that the cam mechanism 28, 41, 44 is replaced by a reversible screw thread mechanism. The friction clutch in FIG. 9 comprises a flange 60 on the nut 18 and a collar 61 urged by a spring 62 against the flange 60. The collar 61 has a reversible screw thread connection 63 with a bush 64 secured in the piston blind bore 26 by an annular disc 65 force-fitted into the open end of this bore. The spring 62 bears against the disc 65 through a thrust bearing 66. The parts 61 and 64 are both manufactured of a material, such as polytetrafluoroethylene, having a suitable coefficient of friction. It will be noted that the screw thread connection 19 between the rod 17 and the nut 18 is a right-hand thread whereas the reversible screw thread connection 63 between the collar 61 and the bush 64 is of opposite hand. The adjuster of FIG. 9 operates in exactly the same manner as that of FIG. 8 since the reversible screw thread connection 63 and the compression spring 62 are equivalent to the cam 41, 44 or the reversible screw thread members 61, 64.

It is to be noted that in the embodiments of FIGS. 4 to 9, the same axial force is transmitted through the screw thread connection 19 and through the friction brake 20, 21 or the friction clutch 41, 42 or 60, 61, neglecting the compressive force of the spring 31, 47 or 62. Also this same force is applied between the cam members 20, 27, or 41, 44 or the reversible screw thread members 61, 64.

The hydraulic actuator shown in FIGS. 10 and 11 comprises a pair of opposed pistons 70 and 71 slidable in a through bore 72 in a fixed body member 73. The piston 71 bears against the directly operated pad which prevents the piston 70 from turning. The piston 71 bears against the yoke which prevents the piston 71 from turning and which supports the indirectly operated pad opposed to the directly operated pad. The automatic adjuster of FIG. 10 comprises the piston 70, a rod 74, a clutch part 75 cooperating with a flange 76 on the rod 74 and a plunger 77 (see FIG. 11). A screw thread connection 78 between the rod 74 and the piston 70 is equivalent to the screw thread connection 3 shown in FIG. 1. Rightward movement of the rod 74 in the piston 71 is limited by a cam 79 journalled in the piston 71 and acting on the right-hand end of the rod 74 through a dolly 80. The cam 79 forms part of a purely mechanical brake actuator, such as a hand brake, and its rotation in a clockwise sense is limited by a stop (not shown). A sealing ring 81 seals the rod 74 to the piston 71 and sealing rings 82 seal the pistons 70 and 71 to the bore 72.

The plunger 77 is slidable in a bore 83 in the body 73 and extending transversely to the axis of the rod 74. A return spring 84 acts between the right-hand end of the plunger 77 (FIG. 11) and a plug 85 closing the end of the bore 83. A flange 86 on the end of a rod 87 extending from the plunger 77 engages in a notch 88 in the periphery of the annular clutch part 75. The left-hand face of the plunger 77 is exposed to the fluid pressure prevailing in the space 89 between the opposed pistons 70 and 71, which space is connected to the hydraulic brake fluid line through an inlet (not shown). Thus, when the brake pressure reaches a relatively low value of, for example, 100 lbs. per sq. inch, the force of the spring 84 is overcome and the plunger 77 is moved to the right in FIG. 11. This turns the clutch part 75 in a clockwise direction. When the brake pressure is released the spring 84 returns the plunger 77 and the clutch part 75 into their initial positions.

A Belleville-type spring washer 90 acts between another washer 91 bearing against an inturned flange 92 on the clutch part 75 and a spring ring 93 received in a groove in the periphery of the rod 74 to urge this inturned flange 92 against the flange 76 on the rod 74.

When the brake is applied by applying fluid pressure to the space 89 between the pistons, the pistons 70 and 71 are urged apart. The rod 74 is urged by the fluid pressure against the dolly 80 because the fluid pressure finds its way through the axial clearance in the screw thread connection 78 to the inner end 94 of the bore in the piston 70 receiving the left-hand end of the rod 74. This axial clearance at the screw thread connection is not completely taken up by the relative axial movement between the pistons 70 and the rod 74 which takes place during normal application of the brake and which takes place during "knock back" of the piston 70 which may occur due to disc deflection, for example on cornering. However, if pad wear has taken place and adjustment is required, the axial clearance at the screw thread connection 78 is completely taken up and the screw thread connection 78 is axially loaded so that a lower torque $T_o$ is required to unscrew the rod 74 from the piston 70 whilst a higher torque $T_i$ is required to screw the rod 74 into the piston 70 (clockwise in FIG. 11). The torque which the friction clutch 75, 76 is capable of transmitting is larger than said lower torque but smaller than said higher torque when the fluid pressure moves the plunger 77 to the right. Thus, this rightward movement turning the clutch part 75 clockwise (in FIG. 11) causes slipping to take place between the flanges 76 and 92 so that the rod 74 is not screwed into the piston 70. When the brake pressure is released, the plunger 77 moves to the left and the clutch part 75 is turned anticlockwise, thus turning the rod 74 in the same direction and unscrewing it slightly from the nut 70 to effect the desired adjustment. It is to be noted that during normal operation of the brake, the rod 74 can turn back and forth freely in the nut 70, because there is no axial loading to create any friction there, and so no nett axial adjustment takes place. Since slipping at the clutch 75, 76 must take place if there is to be any nett axial adjustment, the excessive piston travel must have taken place, taking up the thread clearance before the comparatively low brake pressure required to move the plunger 77 to the right has been reached. This ensures that adjustment when required takes place at a low pressure before appreciable yoke deflection has occurred and the adjustment is therefore more accurate.

The hand brake is applied by turning the cam 79 anticlockwise, so acting on the rod 74 through the dolly 80, the braking force being applied in this instance through the screw thread connection 78 on to the piston 70.

In all of the illustrated embodiments, when the hand brake is applied, the brake force is transmitted through the screw thread connection 19 or 78. The tendency for this force to cause the nut 18 to turn on the rod 17 is resisted by the friction between the nut 18 and the piston 10 in the embodiments of FIGS. 4 to 9 and in the embodiment of FIGS. 10 and 11 the tendency for this force to cause the rod 74 to turn in the piston 70 is resisted by the friction clutch 75, 76. To further reduce the risk of the hand-applied brake force to turn the nut 18 or the rod 74, the screw thread connection can be provided with opposite flanks 3a and 3b having different flank angles $\beta$ and $\beta'$ as shown in FIG. 2. The flank 3a with the smaller flank angle $\beta$ transmits the load when adjustment may take place whereas the flank 3b with the larger flank angle $\beta'$ transmits the hand brake force. The larger flank angle reduces the tendency for the screw thread connection to act as a reversible screw thread under the handbrake force, which tendency arises because of the comparatively large pitch angle $\alpha$ which is desirable in order to achieve a substantial difference between the lower and higher torques $T_o$ and $T_i$.

I claim:

1. An automatic adjuster comprising first and second relatively rotatable members; a screw thread connection between said first and second members; a rotary friction device associated with said second member and having first and second relatively rotatable parts with annular friction faces in frictional engagement with one another; and means for applying an axial load to said screw thread connection in one direction and to said rotary friction device simultaneously and effective responsively to a requirement for adjustment for causing a relative back and forth turning movement between one of said parts of said rotary friction device and one of said first and second members when said screw thread connection is under said axial load in said one direction, the slip torque of said rotary friction device under said axial load being greater than the lower frictional torque arising at said screw thread connection under said axial load when turned in a direction with said axial load but less than the higher frictional torque arising at said screw thread connection under said axial load when turned in a direction against said axial load, whereby said relative back and forth turning movement causes a relative turning movement between said first and second members in one direction only.

2. An adjuster as claimed in claim 1 in which said means for applying said axial load in said one direction to the screw thread connection is effective only when adjustment is required.

3. An adjuster as claimed in claim 1 including means for applying said axial load in said one direction simultaneously to the screw thread connection and to said rotary friction device.

4. An adjuster according to claim 1 in which said first member is non-rotatable relative to said first part of said rotary friction device and said means responsive to a requirement for adjustment is adapted to cause intermittent back and forth relative rotation between said second part of said rotary friction device and said second member.

5. An adjuster as claimed in claim 4 in which said means for causing back and forth relative rotation comprises co-operating helically inclined surface means on said second member and said second part and a return spring acting between said second member and said second part in such a manner that the application of an axial force between said second member and said second part causes relative rotation therebetween with spring return upon removal of such axial force.

6. An adjuster as claimed in claim 5, in which said rotary friction device comprises a friction brake and in which said first part thereof is fixed and said first member is non-rotatable.

7. An adjuster as claimed in claim 1 in which said first part of said rotary friction device effectively comprises part of said second member and said means responsive to a requirement for adjustment is adapted to cause intermittent back and forth relative rotation between the second part of said rotary friction device and said first member.

8. An adjuster as claimed in claim 7 which includes a further member non-rotatable relative to said first member and in which said means for causing back and forth relative rotation comprises co-operating helically inclined surface means on said further member and said second part of said rotary friction device and a return spring effective between said further member and said second part in such a manner that the application of an axial force therebetween causes relative rotation with spring return upon removal by such axial force.

9. An adjuster as claimed in claim 8 in which said rotary friction device comprises a friction clutch and in which said further member is fixed and said first member is non-rotatable.

10. An adjuster as claimed in claim 5 in which said helical surface means comprise co-operating helical cam surfaces.

11. An adjuster as claimed in claim 8 in which said co-operating helical surfaces comprise a reversible screw thread mechanism.

12. In a vehicle brake having a hydraulic actuator comprising a piston and an actuator member opposed to said piston, an automatic adjuster comprising first and second relatively rotatable members cooperating respectively with said actuator member and said piston, a screw thread connection between said members for limiting return movement of the piston relatively towards said actuator member, a rotary friction device associated with said second member and having first and second relatively rotatable parts with annular friction faces in frictional engagement with one another, and means for applying an axial load to said screw thread connection in one direction and to said rotary friction device simultaneously and effective responsively to a requirement for adjustment for causing a relative back and forth turning movement between one of said parts of said rotary friction device and one of said first and second members when said screw thread connection is under said axial load in said one direction, the slip torque of said rotary friction device under said axial load being greater than the lower frictional torque arising at said screw thread connection under said axial load when turned in a direction with said axial load but less than the higher frictional torque arising at said screw thread connection under said axial load when turned in a direction against said axial load, whereby said relative back and forth turning movement causes a relative turning movement between said first and second members in one direction only.

13. A brake as claimed in claim 12 which further comprises an auxiliary mechanical actuator fitted in said actuator member, said first member engaging said auxiliary mechanical actuator.

14. A brake as claimed in claim 12 in which the hydraulic actuator includes a body member with a cylinder bore therethrough and in which said opposed actuator member comprises a second piston opposed to the first-mentioned piston, said pistons being slidable in said cylinder bore.

15. A brake as claimed in claim 13 in which the auxiliary mechanical actuator comprises a cam journalled in said actuator member for rotation about an axis substantially perpendicular to the piston axis.

16. A brake as claimed in claim 12 in which said first member comprises a rod slidable in said actuator member and which further comprises means hydraulically sealing said rod to said actuator member.

17. In a vehicle brake having a hydraulic actuator comprising a piston and an actuator member opposed to said piston: an automatic adjuster comprising first and second relatively rotatable members cooperating respectively with said actuator member and said piston: a screw thread connection between said members for limiting return movement of the piston relatively towards said actuator member; a pre-loaded rotary friction clutch associated with said second member and having first and second relatively rotatable parts with cooperating friction surfaces thereon and means urging said friction surfaces into frictional engagement with one another with a predetermined force; and means for applying an axial load to said screw thread connection in one direction; and means effective responsively to a requirement for adjustment for causing a back and forth turning movement of one of said parts of said rotary friction clutch relative to one of said first and second members when said screw thread connection is under said axial load in said one direction and when said axial load has a predetermined magnitude, the other of said clutch parts comprising a part of said second member, the slip torque of said rotary friction clutch being greater than the lower frictional torque arising at said screw thread connection when turned in a direction with said axial load of predetermined magnitude but less than the higher frictional torque arising at said screw thread connection when turned in a direction against said axial load of predetermined magnitude, whereby said relative back and forth turning movement causes a relative turning movement between said first and second members in one direction only.

18. A brake as claimed in claim 17 in which the means effective to cause a relative turning movement comprises an auxiliary piston exposed to the brake fluid pressure, a counter-spring acting on the auxiliary piston against the fluid pressure, and means coupling said auxiliary piston to said one part of said friction clutch.

19. An adjuster as claimed in claim 18 in which said second member comprises a rod axially slidable in said actuator member and means are provided to hydraulically seal said rod to said actuator member and in which the slip torque of the pre-loaded friction clutch the cross section of the auxiliary piston, the force of said counter-spring and the cross section of said rod are so chosen that the slip torque of said pre-loaded friction clutch lies between said higher and lower frictional torques arising at said screw thread connection at the hydraulic pressure which just overcomes the force of said counter-spring.

20. An adjuster as claimed in claim 1 in which said annular friction faces have a larger mean diameter than said screw thread connection and at least the friction face of one part of the rotary friction device comprises a low friction material.

21. An adjuster as claimed in claim 20 in which the low friction material comprises polytetrafluoroethylene.

22. An adjuster as claimed in claim 1 in which the screw thread connection has mating flanks subjected to said axial force in said one direction and having a relatively small flank angle and has further mating flanks opposed to the first-mentioned flanks and having a relatively large flank angle.

References Cited

UNITED STATES PATENTS

| | | | |
|---|---|---|---|
| 2,949,173 | 8/1960 | Peras | 188—196 |
| 3,068,964 | 12/1962 | Williams et al. | 188—196 X |
| 3,244,260 | 4/1966 | Frayer | 188—196 |
| 3,344,891 | 10/1967 | Thirion | 188—73 |
| 3,378,109 | 4/1968 | Bauman | 188—196 X |

MILTON BUCHLER, Primary Examiner

DUANE A. REGER, Assistant Examiner

U.S. Cl. X.R.

188—73